Patented Nov. 5, 1940

2,220,464

UNITED STATES PATENT OFFICE 2,220,464

ALLOY

Cyril Stanley Smith, Cheshire, and Ira Thomas Hook, New Haven County, Conn., assignors to The American Brass Company, a corporation of Connecticut No Drawing. Application November 6, 1939, Serial No. 303,094

7 Claims. (Cl. 75—154)

This invention relates to alloys, and has for its principal object the provision of an improved copper-base alloy which is particularly well adapted for use as a welding material for welding articles composed largely of copper.

Heretofore in the welding of copper by the oxyacetylene or electric arc methods, it has been customary to employ a welding or filler rod of a copper alloy containing phosphorus to prevent excessive oxidation of the weld metal. Silver ordinarily is included in such welding alloys to improve fluidity of the metal. These phosphorus-bearing welding rods are not altogether satisfactory, for the freshly deposited metal is hot short and is very likely to crack from strains set up during cooling of the welded structure. It has been proposed to substitute silicon for the phosphorus, but silicon alone forms a refractory and tenacious oxide over the surface of the metal during welding. In cases where it is not essential to have weld metal of substantially the same composition and chemical or mechanical properties as the base metal, welds have been made with stronger alloys of lower melting points, such, for example, as the phosphor bronzes containing relatively large amounts of tin, or copper alloys containing about 3 per cent silicon, often with other metals. In general, however, it is preferable that the welding rod have a composition as near to pure copper as is compatible with suitable welding characteristics.

As a result of an exhaustive research, we have found that an alloy comprising about 0.1% to 1% tin, together with silicon and manganese in approximately equal proportions, the total amount of silicon and manganese being not greater than about 0.75%, and the balance substantially all copper, gives excellent results as a filler metal for welding either tough pitch copper or copper containing no oxygen. It has been proposed heretofore to employ both silicon and manganese in welding alloys consisting predominantly of copper, but we have found that greatly improved results are obtained with alloys of this type in which tin also is incorporated.

Silicon is a desirable component of the alloy as in equal amounts it is nearly as effective a deoxidizer for copper as phosphorus. It forms a continuous film on molten copper deoxidized or alloyed with it. Moreover, it does not promote hot shortness in copper, as does phosphorus. Manganese is a desirable component, as it is both a deoxidizer and desulphurizer for copper.

Although either silicon or managanese will act as a deoxidizer for copper, we prefer both elements, finding in the combination beneficial results greater than those obtainable with either element alone. Thus, the manganese modifies the silica glass film on molten copper, making it more fluid and flux-like than when silicon is used alone. This film is continuous over the weld pool, protecting the weld metal from the heated gases present in the welding flame or the welding arc, but it is easily broken to allow perfect metallic junction with further additions of molten metal or with adjacent solid metal. When phosphorus is used as a deoxidizer, it develops no such protective, flux-like film.

The best results are obtained when silicon and manganese are used in approximately equal proportions, but the relative amounts may vary as long as one is not more than twice the other. Because of the slight strengthening effect, a relatively larger amount of silicon is preferable to a relatively larger amount of manganese, but in some cases a relatively high proportion of manganese may be preferred.

The addition of tin in accordance with the invention to copper welding alloys containing silicon and manganese materially lessens the amounts of these latter elements required to secure optimum welding properties. Consequently welding alloys according to the invention possess chemical and physical properties more closely approaching the corresponding properties of copper as it is ordinarily used in articles fabricated by welding, and copper articles welded with the new alloy exhibit more nearly uniform properties from base metal to base metal across the weld. The presence of tin in alloys according to the invention is advantageous also for the reason that it depresses the melting point of the weld metal to slightly below that of the copper base metal, thus improving its fluidity and general handling qualities. Tin also has the beneficial effect of somewhat increasing the strength of the weld metal.

A particularly satisfactory alloy for general use is composed of about 0.75% tin, about 0.25% silicon, and about 0.20% manganese, with the balance being substantially all copper, but these elements may be varied within the ranges of about 0.1% to 1% tin, about 0.05% to 0.5% manganese, and about 0.05% to 0.5% silicon. The usual impurities occurring in the components of the alloy as they are available commercially may, of course, be present unless they impair the welding properties of the alloy, but ordinarily the alloy should contain at least about 98% copper.

As an example of a use of the new alloy and to show its superiority over present commercial welding rods, the results of tests on a series of welds made by various methods on deoxidized copper sheet are set forth in the following table. Each figure is the average of several tests. Welding rod "A" referred to in the table was a commercial silver-bearing deoxidized rod containing phosphorus, and welding rod "B" was formed of an alloy according to the invention composed of 0.7% tin, 0.2% silicon, 0.19% manganese, and the balance copper.

metal in order to avoid the well-known embrittlement that occurs when copper containing oxygen is heated to high temperatures, especially in reducing atmospheres. Excellent results are obtained when welding the ordinary deoxidized copper of commerce containing phosphorus or silicon, but the use of the rod is not limited to these base metals.

An alloy of over 98 per cent copper with silicon, manganese and tin in proportions substantially as outlined above for the filler rod may

| Type of weld | Metal welded | Welding rod | Tensile strength, lbs./sq. in. | Elongation percent in 2" | Fracture |
|---|---|---|---|---|---|
| Oxyacetylene | ⅛" deoxidized Cu sheet | A | 23,500 | 18 | In weld. |
|  |  | B | 30,800 | 49 | In base metal. |
| Carbon arc | ¼" deoxidized Cu sheet | A | 17,300 | 4 | In weld. |
|  |  | B | 30,000 | 33 | Edge of weld. |
| Metallic arc | ¼" deoxidized Cu sheet | A | Satisfactory welds for testing could not be made. | | |
|  |  | B | 27,600 | 26 | Edge of weld. |

One of the most significant facts indicated in the foregoing table is that with the new rod, owing to the superior ductility of the weld metal, the fractures did not occur in the weld. Also of significance is the fact that the new rod is equally well suited for oxyacetylene, carbon arc or metallic arc welding, whereas the commercial rod gave very inferior results when used for either type of arc welding.

It is an important advantage of the new welding alloy that it will give good results with any of the methods of welding in use at the present time. The new welding rod gives sound, ductile, fine-grained welds with either oxyacetylene, carbon arc, or metallic arc welding. The phosphorus deoxidized welding rods heretofore extensively used cannot be employed satisfactorily for arc welding because of the excessive oxidation and volatilization of the phosphorus.

It is a serious draw-back to the phosphorus rods heretofore customarily employed that the freshly deposited metal is hot short and is very likely to crack from strains resulting from the cooling of the welded structure. Our improved alloy has practically no hot short range and will withstand considerable abuse in welding.

When the greatest attainable strength is necessary of welded joints in pure copper, it has been usual to hammer and anneal the weld. Our improved filler metal as deposited during welding is slightly stronger than the annealed copper base metal after welding, and is nearly as ductile. Consequently it is unnecessary to subject the weld to any mechanical or thermal treatment after it is finished, unless it is desired to dress the weld for the sake of appearance.

The new filler rod contains upwards of 98% copper and possesses the color and general physical, mechanical and chemical properties of commercial copper such as ordinarily is welded. Seams welded with the new alloy may be hammered, flanged, or submitted to other hot or cold working operations just as readily as the unwelded metal. Moreover, corrosion resistance of the weld metal is practically identical with that of copper, and electrolytic corrosion is not likely to occur. This is of great importance in the case of copper vessels welded for the chemical industries. The alloy is not unduly liable to stress-corrosion cracking, as are certain welding rods of lower copper content.

When using this rod, as with any other type of copper welding rod, it is preferable to employ an oxygen-free or deoxidized copper for the base with advantage be employed for the base metal also. This is particularly advantageous in welding operations wherein a projecting edge of the base metal itself provides the filler material for welding, but it may also be used for vessels fabricated in the ordinary way where somewhat superior strength is required. To avoid the purchase of additional supplies, coppersmiths often like to cut a strip from the outer portions of the material they are fabricating for use as a filler rod in welding. This practice gives very poor results with tough-pitch copper, but if the copper base metal contains tin, silicon and manganese in accordance with our invention, the resulting weld will be of the highest quality.

The new alloys are readily cast and hot or cold worked in accordance with the usual procedures for handling copper alloys generally. Welding rods of the new alloy may be flux coated if desired, but this is not necessary. Except when welding small parts that can be kept under reducing flame at all times, however, it is desirable to paint the surface of the parts to be joined with a suitable protective flux.

The welding rod of the invention is especially suited for welding copper plates, tubes, pipes, rods, or other copper shapes in the construction of vessels for chemical plants, for water storage, or for any other purpose where copper is employed for reason of its resistance to corrosion, its thermal or electrical conductivity, its color, ductility or other property. While the rod is especially suited for welding articles composed largely of copper, such as articles made of metal containing upwards of 98% copper, it may be used for welding other materials having the same or higher melting points, such, for example, as alloys of copper and nickel, cast iron, steel, stainless steel, and the like.

We claim:
1. A copper-base alloy comprising about 0.1% to 1% tin, about 0.05% to 0.5% silicon, about 0.05% to 0.5% manganese, and the balance substantially all copper.
2. A copper-base alloy comprising about 0.75% tin, about 0.25% silicon, about 0.2% manganese, and the balance substantially all copper.
3. A copper-base alloy comprising about 0.1% to 1% tin, together with silicon and manganese in substantially equal proportions, the total amount of silicon and manganese being not greater than about 0.75%, and the balance substantially all copper.
4. A welding rod adapted for welding articles composed largely of copper, comprising about 0.1% to 1% tin, about 0.05% to 0.5% silicon, about 0.05% to 0.5% manganese, and at least about 98% copper.

5. A welding rod adapted for welding articles composed largely of copper, comprising about 0.75% tin, about 0.25% silicon, about 0.2% manganese, and at least about 98% copper.

6. A welding rod adapted for welding articles composed largely of copper, comprising about 0.1% to 1% tin, together with silicon and manganese in approximately equal proportions, the total amount of silicon and manganese being not greater than about 0.75%, and at least about 98% copper.

7. A metallic article composed largely of copper and having a welded joint, the weld metal at the joint being composed of about 0.1% to 1% tin, about 0.05% to 0.5% silicon, about 0.05% to 0.5% manganese, and the balance substantially all copper.

CYRIL STANLEY SMITH.
IRA THOMAS HOOK.